（12）United States Patent
Lee et al.

(10) Patent No.: US 11,356,145 B2
(45) Date of Patent: Jun. 7, 2022

(54) WIRELESS CHARGING APPARATUS AND METHOD

(71) Applicant: Samsung Electronics Co., Ltd., Gyeonggi-do (KR)

(72) Inventors: Woo-Ram Lee, Gyeonggi-do (KR); Joon-ll Kim, Seoul (KR); Kyu-Jae Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 264 days.

(21) Appl. No.: 15/946,438

(22) Filed: Apr. 5, 2018

(65) Prior Publication Data

US 2018/0227017 A1 Aug. 9, 2018

Related U.S. Application Data

(63) Continuation of application No. 13/859,329, filed on Apr. 9, 2013, now Pat. No. 9,973,237.

(30) Foreign Application Priority Data

Apr. 9, 2012 (KR) .................... 10-2012-0036888

(51) Int. Cl.
*H04B 5/00* (2006.01)
*H02J 7/00* (2006.01)
(Continued)

(52) U.S. Cl.
CPC .......... *H04B 5/0037* (2013.01); *H02J 7/0047* (2013.01); *H02J 7/025* (2013.01); *H02J 50/12* (2016.02); *H02J 50/80* (2016.02)

(58) Field of Classification Search
CPC .. H02J 50/10; H02J 50/12; H02J 50/00; H02J 50/80; H02J 50/40; H02J 50/50;
(Continued)

(56) References Cited

U.S. PATENT DOCUMENTS

| 5,734,254 A | 3/1998 | Stephens |
| 2004/0145342 A1* | 7/2004 | Lyon ............... H02J 7/025 320/108 |

(Continued)

FOREIGN PATENT DOCUMENTS

| JP | 2011-029799 | 2/2011 |
| KR | 1020110056334 | 5/2011 |

(Continued)

OTHER PUBLICATIONS

Korean Office Action dated Feb. 12, 2018 issued in counterpart application No. 10-2012-0036888, 9 pages.

(Continued)

*Primary Examiner* — Richard Isla
*Assistant Examiner* — Michael N Dibenedetto
(74) *Attorney, Agent, or Firm* — The Farrell Law Firm, P.C.

(57) ABSTRACT

A wireless charging method and apparatus are provided. Identification information is transmitted, through a near field communication antenna, to a wireless power transmitter for an authentication process of the electronic device, if the electronic device is put on the wireless power transmitter for wireless charging and a near field communication controller is in an initial or idle state. Wireless power is received through a wireless power receiving antenna from the wireless power transmitter after the authentication process. Wireless charging is performed through a wireless charging controller by using the received wireless power. It is determined whether the wireless charging is complete. A charging completion signal is transmitted, through the near field communication antenna, to the wireless power transmitter based on the determining.

9 Claims, 5 Drawing Sheets

(51) Int. Cl.
*H02J 50/12* (2016.01)
*H02J 50/80* (2016.01)
*H02J 7/02* (2016.01)

(58) Field of Classification Search
CPC .. H02J 50/60; H02J 50/90; H02J 17/00; H02J 7/025; H02J 7/0042; H02J 7/0044; H02J 7/0004; H02J 7/0011; H04B 5/0037
USPC .......................................... 320/108; 307/104
See application file for complete search history.

(56) References Cited

U.S. PATENT DOCUMENTS

| | | | |
|---|---|---|---|
| 2008/0067874 A1 | 3/2008 | Tseng | |
| 2010/0142423 A1 | 6/2010 | Zhu | |
| 2010/0142509 A1 | 6/2010 | Zhu | |
| 2010/0156347 A1* | 6/2010 | Lee | H02J 7/0052 320/108 |
| 2010/0194335 A1 | 8/2010 | Kirby | |
| 2010/0225270 A1 | 9/2010 | Jacobs et al. | |
| 2010/0253281 A1 | 10/2010 | Li | |
| 2011/0018358 A1 | 1/2011 | Kozakai | |
| 2011/0127951 A1* | 6/2011 | Walley | H02J 7/025 320/108 |
| 2011/0217927 A1 | 9/2011 | Ben-Shalom et al. | |
| 2012/0032632 A1 | 2/2012 | Soar | |
| 2012/0153740 A1 | 6/2012 | Soar | |
| 2012/0235508 A1 | 9/2012 | Ichikawa | |
| 2012/0242161 A1* | 9/2012 | Kudo | H02J 17/00 307/104 |
| 2012/0303939 A1 | 11/2012 | Caln | |
| 2013/0038278 A1 | 2/2013 | Park | |

FOREIGN PATENT DOCUMENTS

| | | |
|---|---|---|
| KR | 1020110127243 | 11/2011 |
| KR | 1020120128544 | 11/2012 |
| KR | 1020120136725 | 12/2012 |

OTHER PUBLICATIONS

Korean Decision of Grant dated May 28, 2019 issued in counterpart application No. 10-2018-0144463, 7 pages.

* cited by examiner

WIRELESS CHARGING APPARATUS AND METHOD

PRIORITY

This application is a Continuation Application of U.S. application Ser. No. 13/859,329, filed in the U.S. Patent and Trademark Office on Apr. 9, 2013, which claims priority under 35 U.S.C. § 119(a) to Korean Application Serial No. 10-2012-0036888, which was filed in the Korean Intellectual Property Office on Apr. 9, 2012, the content of which is incorporated herein by reference.

BACKGROUND OF THE INVENTION

1. Field of the Invention

The present invention relates generally to a wireless charging apparatus and method, and more particularly, to a wireless charging apparatus and method that control wireless power transmission through a non-contact wireless local communication channel.

2. Description of the Related Art

Various technologies for providing power to portable electronic products have been developed in response to increases in the release and distribution of various portable electronic products along with the development of Information Technology (IT). A technology of receiving power by using a power line was previously used, but a wireless power transmission technology capable of wirelessly receiving power is has been actively developed.

The wireless power transmission technology transmits electric energy in a form of electromagnetic wave, electromagnetic induction, or electromagnetic resonance, which wirelessly supplies power without a power line, such as an electric wire, anytime and anywhere. The wireless power transmission technology is a core technology for wirelessly charging electronic devices, wirelessly supplying or charging power to electric cars, wirelessly supplying power to a remote place, and supplying power through ubiquitous wireless sensors. The wireless power transmission technology may be used to replace conventional methods of supplying or charging power through an electric wire.

When using the wireless power transmission technology for a wireless charging apparatus, the wireless charging apparatus includes a wireless power transmitter for supplying power and a wireless power receiver for charging power to a battery. The wireless power transmitter measures a change in value of loads or a change in value of a resonance frequency in a wireless charging standby state, and detects whether an object is put on a source resonator. Further, when the object is detected, the wireless power transmitter transmits power required for charging to supply the power to the object, and identifies whether the object is an object for the wireless charging or another metal object through an authentication process such as an ID exchange. When the authentication is successfully performed, the wireless power transmitter determines the object put on the source resonator as a wirelessly rechargeable charger, that is, the wireless power receiver, and negotiates the power transmission. When the negotiation is completed, the wireless power transmitter starts wireless power supply for charging the wireless power receiver, and then identifies whether the corresponding wireless power receiver is completely charged. When the wireless power receiver is completely charged, the wireless power transmitter stops transmitting the power to the corresponding wireless power receiver.

The wireless power transmitter and the wireless power receiver perform wireless power transmission control through communication, and a communication scheme includes an in-band communication scheme or out-of-band communication scheme. The in-band communication scheme performs the wireless power transmission control by using the same frequency band as a wireless supply frequency band and a communication frequency band between the wireless power transmitter and the wireless power receiver. The out-of-band communication scheme performs the wireless power transmission control by using different frequency bands as a wireless supply frequency band and a communication frequency band between the wireless power transmitter and the wireless power receiver.

Since the wireless charging apparatus is currently applied to a portable small electronic device, components therein become smaller, and various configurations and circuit arrangement techniques are used to improve the capability thereof.

For example, the wireless charging apparatus is applied to a portable terminal that receives power from a charging pad and performs battery charging. The portable terminal employs a technique which makes sizes of components for the wireless charging small, arranges some components for the wireless charging within the portable terminal to improve the capability thereof, and connects the remaining components arranged outside the portable terminal through connection terminals.

For example, FIG. 1 illustrates a portable terminal to which a wireless charging apparatus is applied. Referring to FIG. 1, the portable terminal includes a portable terminal body 10 and an external battery cover 20. When the wireless charging apparatus is applied to the portable terminal, some components for wireless charging are included in the body 10, and remaining components 22 for wireless charging are arranged on the external battery cover 20. The wireless charging apparatus can operate through a connection between the components of the wireless charging apparatus located in the body 10 and the components of the wireless charging apparatus located in the external battery cover 20 by means of the wireless charging connection terminals.

However, the portable terminal includes other components for functions other than wireless charging, which are separately located within the body 10 and on the external battery cover 20. For example, component 26 for non-contact local communication may be separately arranged within the body 10 and on some areas of the external battery cover 20, and components for non-contact local communication may operate through connection terminals for the non-contact local communication indicated by reference numerals 15 and 25.

As described above, when there are connection terminals 11, 21, 15, and 25 for wireless charging and non-contact local communication in the portable terminal, the number of connection terminals increase in production of the portable terminal, which makes a manufacturing process complex.

When the components for wireless power transmission and the components for non-contact local communication are redundant, a plurality of communication components is required, which results in inefficiency and resource waste.

SUMMARY OF THE INVENTION

The present invention has been made to address at least the above problems and/or disadvantages and to provide at least the advantages described below. Accordingly, an aspect of the present invention provides a wireless charging apparatus and method, which allow for wireless charging and non-contact local communication through a pair of connection terminals by using a switch when a plurality of connection terminals for wireless charging and non-contact local communication are required.

Another aspect of the present invention provides a wireless charging apparatus and method that do not need a separate communication module for wireless charging by performing wireless power transmission control for wireless charging by using non-contact local communication.

In accordance with an aspect of the present invention, a wireless charging method by an electronic device is provided. Identification information is transmitted, through a near field communication antenna, to a wireless power transmitter for an authentication process of the electronic device, if the electronic device is put on the wireless power transmitter for wireless charging and a near field communication controller is in an initial or idle state. Wireless power is received through a wireless power receiving antenna from the wireless power transmitter after the authentication process. Wireless charging is performed through a wireless charging controller by using the received wireless power. It is determined whether the wireless charging is complete. A charging completion signal is transmitted, through the near field communication antenna, to the wireless power transmitter based on the determining.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
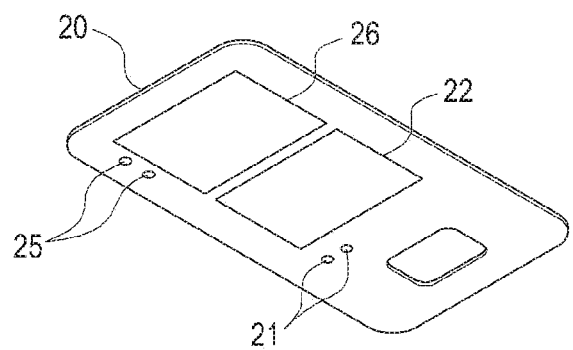
FIG. 1 is a diagram illustrating a portable terminal to which a wireless charging apparatus is applied.
Figure 1:
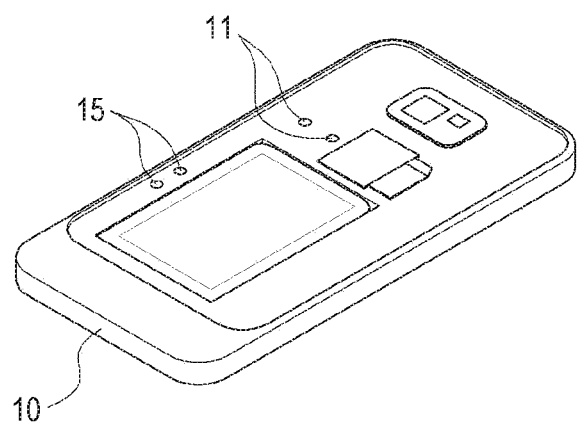

Embodiments of the present invention are described in detail with reference to the accompanying drawings. The same or similar components may be designated by the same or similar reference numerals although they are illustrated in different drawings. Further, various specific definitions found in the following description are provided only to assist in a general understanding of the present invention, and it is apparent to those skilled in the art that the present invention can be implemented without such definitions. Detailed descriptions of constructions or processes known in the art may be omitted to avoid obscuring the subject matter of the present invention.

Embodiments of the present invention disclose a wireless charging apparatus and method that perform communication for wireless power transmission control by using non-contact local communication between a wireless power transmitter for transmitting wireless power and a wireless power receiver for receiving wireless power to perform charging. Some components for wireless charging arranged within the wireless power receiver and the remaining components for wireless charging arranged outside the wireless power receiver are connected through a pair of connection terminals. Particularly, embodiments of the present invention describe a case of using, for example, a Near Field Communication (NFC) scheme as the non-contact wireless local communication scheme. However, other wireless local communication schemes such as, for example, a ZigBee communication scheme, a Bluetooth communication scheme, an infrared communication scheme, and the like, may also be used as the non-contact wireless local communication scheme.

Further, the wireless charging apparatus, according to embodiments of the present invention, can be applied for wirelessly charging an electronic device, wirelessly supplying and charging power to an electric car, wirelessly supplying power to a remote place, supplying power through ubiquitous wireless sensors, and the like, and includes any device as long as the device can transmit wireless power and receive the wireless power to perform the charging.

In order to assist in understanding of the present invention, embodiments of the present invention describe a case of applying a wireless power transmission control device to a portable terminal including a body and a battery, and a charging pad.

Figure 2:
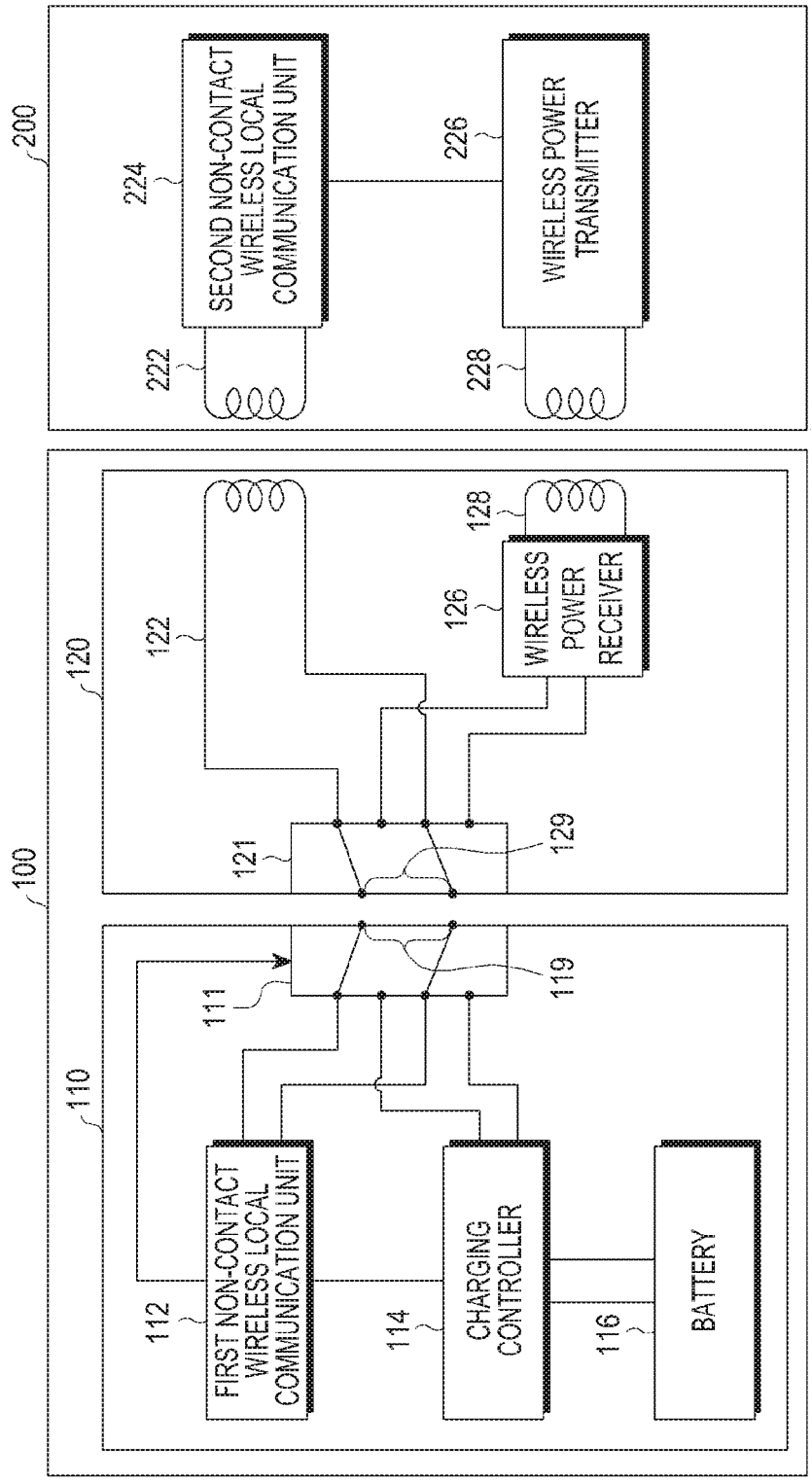
FIG. 2 is a diagram illustrating a configuration of a wireless charging apparatus, according to an embodiment of the present invention.

The wireless charging apparatus is described in detail below, according to an embodiment of the present invention. FIG. 2 is a diagram illustrating a configuration of the wireless charging apparatus, according to an embodiment of the present invention.

Referring to FIG. 2, the wireless charging apparatus, according to an embodiment of the present invention, includes a portable terminal 100 corresponding to a wireless power receiver and a charging pad 200 corresponding to a wireless power transmitter.

The charging pad 200 includes a second non-contact wireless local communication antenna 222, a second non-contact wireless local communication unit 224, a wireless power transmitter 226, and a transmission (TX) resonator 228.

The wireless power transmitter 226 generates various types of messages required for wireless power transmission to transmit the generated messages to the portable terminal 100 through the second non-contact wireless local communication unit 224. The wireless power transmitter 226 receives a message transmitted from the portable terminal 100 through the second non-contact wireless local communication unit 224. The wireless power transmitter 226 calculates a supply power quantity to be transmitted through the TX resonator 228 based on information received from the portable terminal 100. The wireless power transmitter 226 transmits the calculated supply power quantity through the TX resonator 228.

The TX resonator 228 includes a resonance coil, and resonates on the same frequency with a TX resonator 128 of the portable terminal 100 to transmit supply power to the portable terminal 100.

The second non-contact wireless local communication unit 224 performs non-contact local communication, for example, NFC, with the portable terminal 100 through the second non-contact wireless local communication antenna 222. The second non-contact wireless local communication unit 224 transmits a message received from the portable terminal 100 to the wireless power transmitter 226, and transmits a message to be transferred from the wireless power transmitter 226 to the portable terminal 100.

The portable terminal 100 corresponds to the wireless power receiver for wirelessly receiving power from the charging pad 200 and charging the power. The portable terminal 100 includes a body 110, physically corresponding to a first area, and a battery cover 120, corresponding to a second area physically separated from the first area.

A first non-contact wireless local communication unit 112, a charging controller 114, a battery 116, a first switch 111, and a first terminal 119 are arranged at the body 110. A first non-contact wireless local communication antenna 122, a wireless power receiver 126, a reception (RX) resonator 128, a second switch 121, and a second terminal 129 are arranged at the battery cover 120.

The first components 112, 114, 116, and 111 for wireless charging arranged at the body 110, and the second components 122, 126, 128, and 121 for wireless charging arranged at the battery cover 120, are connected through the first and second terminals 119 and 229 according to operations of the first switch 111 and the second switch 121.

Specifically, the first non-contact wireless local communication unit 112 and the first non-contact wireless local communication antenna 122 are connected through the first and second terminals 119 and 129 according to the operation of the first switch 111. Further, the wireless power receiver 126 and the charging controller 114 are connected through the first and second terminals 119 and 229 according to the operation of the second switch 121. In an initial state (or idle state), the first and second switches 111 and 121 maintain a state where the first non-contact wireless local communication unit 112 and the first non-contact wireless local communication antenna 122 are connected.

The components separately arranged at the body 110 and the battery cover 120 are described in detail below. The first non-contact wireless local communication unit 112 controls the first switch 111 to perform communication for wireless charging control, and connects the first non-contact wireless local communication unit 112 and the first non-contact wireless local communication antenna 122. The first switch 111 performs a switching operation for connecting the first non-contact wireless local communication unit 112 with the first terminal 119 according to a control of the first non-contact wireless local communication unit 112. The first switch 111 includes the first terminal 119. One side of the first switch 111 is connected to the first non-contact wireless local communication unit 112 and the charging controller 114, and the other side is connected to the first terminal 119. The first switch 111 performs a switching operation of connecting the first terminal 119 with one of the first non-contact wireless local communication unit 112 and the charging controller 114, according to a control signal of the first non-contact wireless local communication unit 112.

The first non-contact wireless local communication unit 112 is connected with the first non-contact wireless local communication antenna 122, according to connection between the first terminal 119 and the second terminal 129. The first non-contact wireless local communication unit 112 performs non-contact local communication, for example, NFC, with the charging pad 200 when the first non-contact wireless local communication unit 112 is connected with the first non-contact wireless local communication antenna 122. The first non-contact wireless local communication unit 112 transmits a message received from the charging pad 200 and transmits a message to be transferred from the charging controller 114 to the charging pad 200.

The RX resonator 128 includes a resonance coil, and resonates with the TX resonator 228 of the charging pad 200 on the same frequency. When receiving supply power through the TX resonator 228, the wireless power receiver 126 is connected with the charging controller 114 by controlling the second switch 121. The second switch 121 performs a switch operation for connecting the wireless power receiver 126 with the second terminal 129, according to a control of the wireless power receiver 126.

The second switch 121 includes the second terminal 129 physically connected with the first terminal 119. One side of the second switch 121 is connected to the second non-contact wireless local communication antenna 122 and the wireless power receiver 126, and the other side is connected to the second terminal 129. The second switch 121 performs a switch operation for connecting the second terminal 129 with one of the second non-contact wireless local communication antenna 122 and the wireless power receiver 126, according to a control signal of the wireless power receiver 126.

The wireless power receiver 126 is connected with the charging controller 114 according to connection between the second terminal 129 and the first terminal 119. When the wireless power receiver 126 is connected with the charging controller 114, the wireless power receiver 126 transmits the supply power received through the TX resonator 228 to the charging controller 114. The charging controller 114 rectifies the supply power to charge the rectified supply power to the battery 116.

The first non-contact wireless local communication unit 112 controls the first switch 111 to perform communication for the wireless charging control, and connects the first non-contact wireless local communication unit 112 with the first non-contact wireless local communication antenna 122. The first switch 111 performs a switching operation for connecting the first non-contact wireless local communication unit 112 with the first terminal 119, according to a control of the first non-contact wireless local communication unit 112.

The first non-contact wireless local communication unit 112 is connected to the first non-contact wireless local communication antenna, according to connection between the first terminal 119 and the second terminal 129. The first non-contact wireless local communication unit 112 performs non-contact wireless local communication, for example, NFC, with the charging pad 200 in a state where the first non-contact wireless local communication unit 112 is connected with the first non-contact wireless local communication antenna 122. The first non-contact wireless local communication unit 112 transmits a message received from the charging pad 200 to the charging controller 114, and transmits a message to be transferred from the charging controller 114 to the charging pad 200.

A wireless charging method based on the operation of the wireless charging apparatus is described in detail below, according to an embodiment of the present invention.

Figure 3:
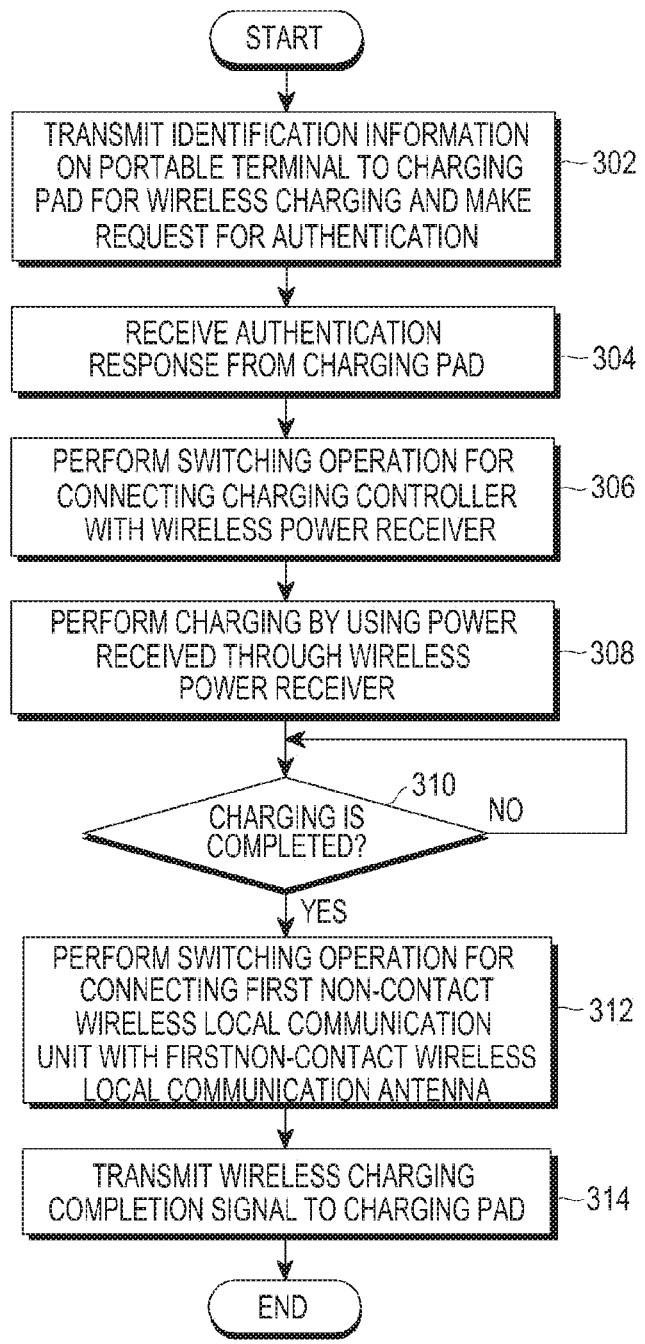
FIG. 3 is a flowchart illustrating a wireless charging method, according to an embodiment of the present invention.

FIG. 3 is a flowchart illustrating a wireless charging method, according to an embodiment of the present invention.

When the portable terminal 100 is put on the charging pad 200 for the charging in an initial (idle) state and the first non-contact wireless local communication unit 112 is connected with the first non-contact wireless local communication antenna 122, the portable terminal 100 transmits identification information of the portable terminal 100 to the charging pad 200 through the first non-contact wireless local communication unit 112 and the first non-contact wireless local communication antenna 122 and makes a request for the authentication, in step 302.

Accordingly, the charging pad 200 performs the authentication by using the identification information of the portable terminal 100, transmits an authentication response message according to an authentication result to the portable terminal 100, and supplies power through the wireless power transmitter 226 and the TX resonator 228 as the authentication is completed.

The portable terminal 100 receives the authentication response message from the charging pad 200 through the first non-contact wireless local communication unit 112 and the first non-contact wireless local communication antenna 122, in step 304.

The portable terminal 100 performs a switching operation through the first switch 111 and the second switch 121 to connect the charging controller 114 arranged at the body 110 with the wireless power receiver 126 arranged at the battery cover 120, in step 306.

Figure 4:
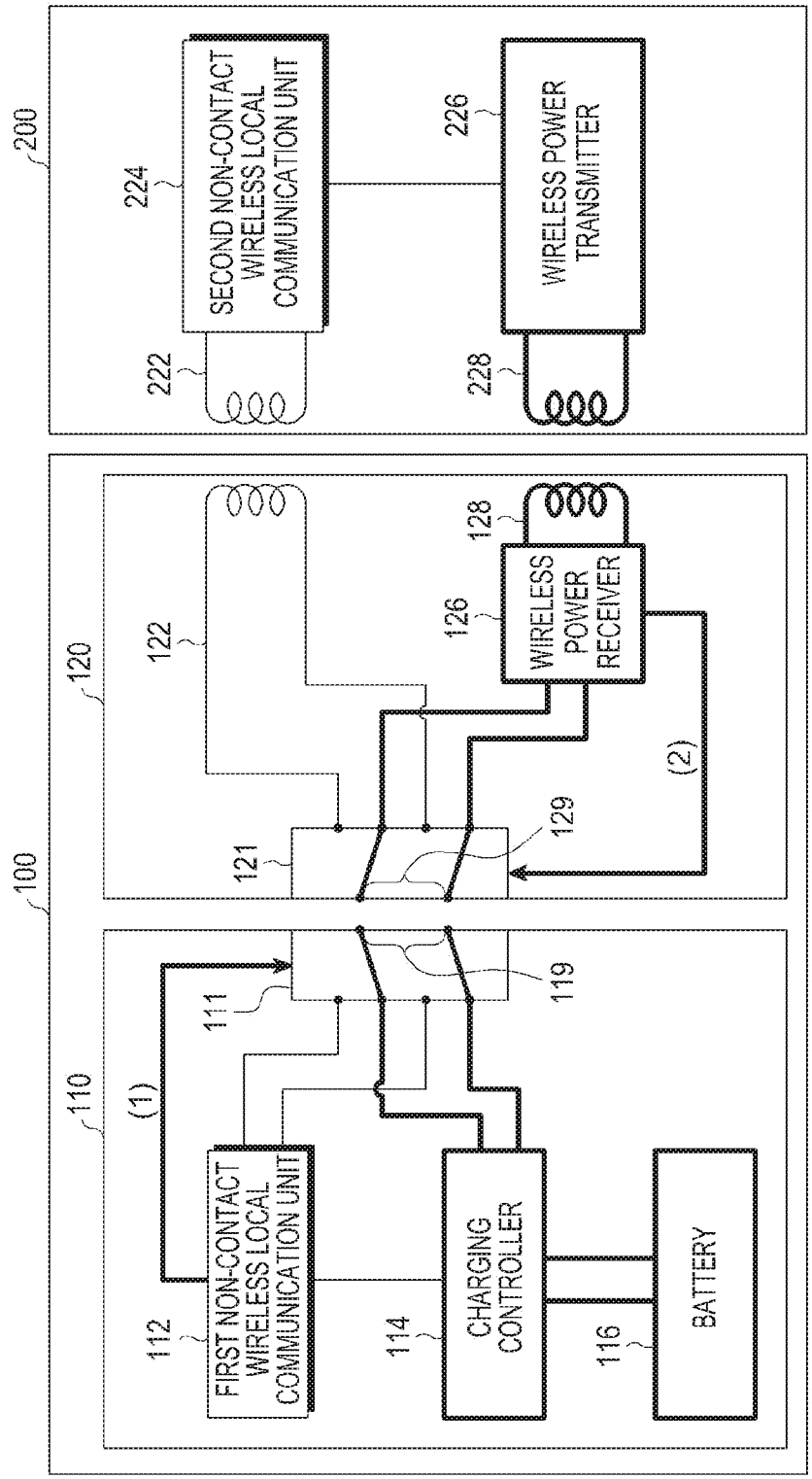
FIG. 4 is a diagram illustrating a state in which a charging controller arranged at a body is connected with a wireless power receiver arranged on a battery cover in a portable terminal, according to an embodiment of the present invention.

Specifically, FIG. 4 is a diagram illustrating a state where the charging controller 114 arranged at the body 110 is connected with the wireless power receiver 126 arranged at the battery cover 120 in the portable terminal 100, according to an embodiment of the present invention.

Referring to FIG. 4, the portable terminal 100 controls the first switch to connect the charging controller 114 with the first terminal 119 through the first non-contact wireless local communication unit 112, and controls the second switch 121 to connect the wireless power receiver 126 with the second terminal 129 through the wireless power receiver 126.

The first non-contact wireless local communication unit 112 can transmit a control signal 1 to the first switch 111 for connecting the charging controller 114 with the first terminal 119. The wireless power receiver 126 can transmit a control signal 2 to the second switch 121 for connecting the wireless power receiver 126 with the second terminal 129, according to a current change or a voltage change as the RX resonator 128 resonates by the TX resonator 228.

Referring back to FIG. 3, when the charging controller 114 and the wireless power receiver 126 are connected through the first terminal 119 and the second terminal 129 and enter a charging mode, the portable terminal 100 receives power supplied from the charging pad 200 through the wireless power receiver 126 and charges the power to the battery 116, in step 308.

Further, the portable terminal 100 determines whether the charging is completed, in step 310. When the charging of the battery 116 is completed, the portable terminal 100 performs the switching operations through the first switch 111 and the second switch 121 to connect the first non-contact wireless local communication unit 112 with the first non-contact wireless local communication antenna 122, in step 312.

Figure 5:
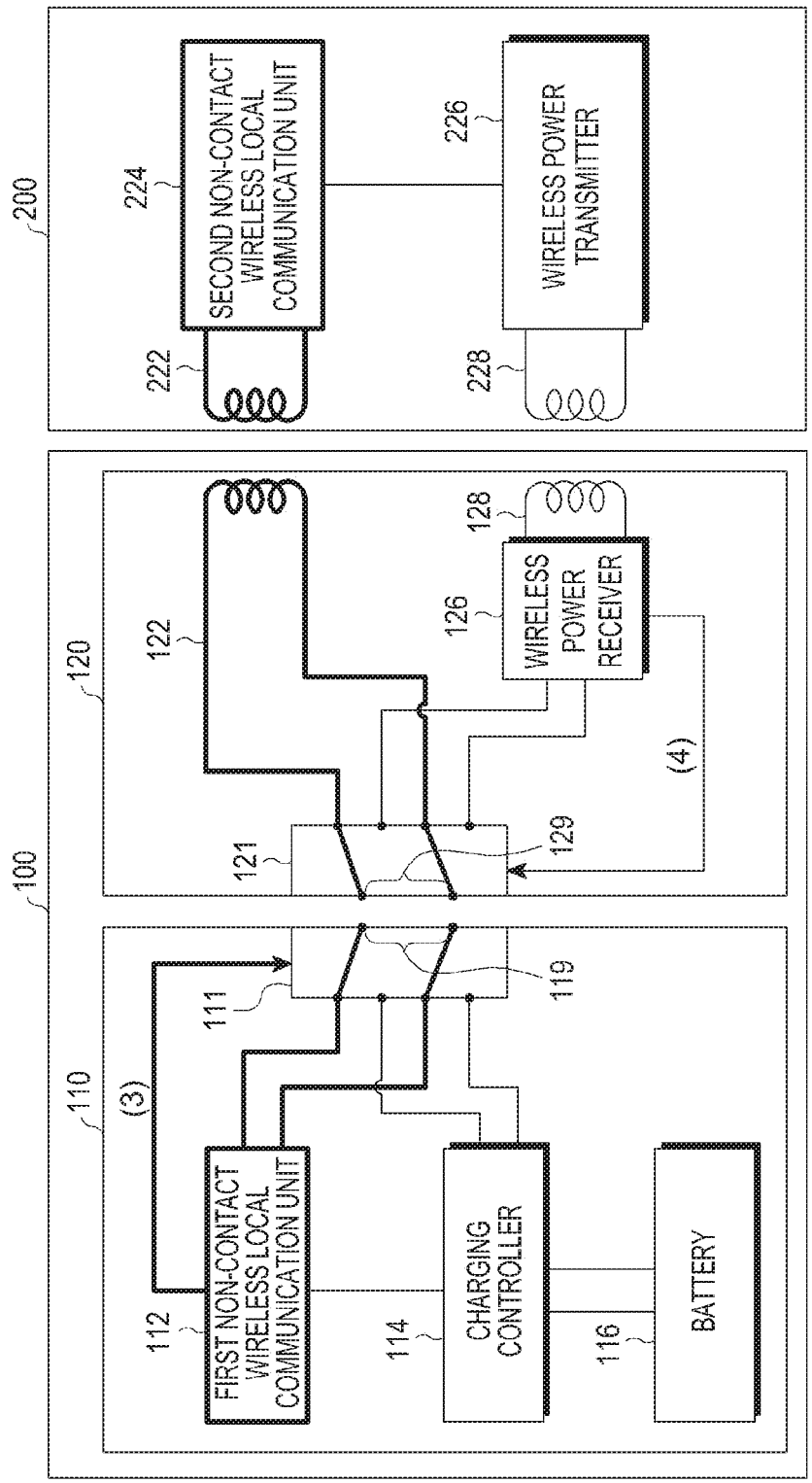
FIG. 5 is a diagram illustrating a state in which a first non-contact local communication unit arranged at a body is connected with a first non-contact wireless local communication antenna arranged on a battery cover in a portable terminal, according to an embodiment of the present invention.

Specifically, FIG. 5 is a diagram illustrating a state where the first non-contact wireless local communication unit 112 arranged at the body 110 is connected with the first non-contact wireless local communication antenna 122 arranged at the battery cover 120 in the portable terminal 100, according to an embodiment of the present invention.

Referring to FIG. 5, the portable terminal 100 controls the first switch 111 to connect the first non-contact wireless local communication unit 112 with the first terminal 119 through the first non-contact wireless local communication unit 112 and controls the second switch 121 to connect the first non-contact wireless local communication antenna 122 with the second terminal 129 through the wireless power receiver 126.

The first non-contact wireless local communication unit 112 can transmit a control signal 3 to the first switch 111 for connecting the first non-contact wireless local communication unit 112 with the first terminal 119. Further, the wireless power receiver 126 can transmit a control signal 4 to the second switch 121 for connecting the first non-contact wireless local communication antenna 122 with the second terminal 129, according a current change of a voltage change as the charging of the battery 116 is completed.

Referring again to FIG. 3, when the portable terminal 100 enters a state where non-contact wireless local communication with the charging pad 200 is possible as the first non-contact wireless local communication unit 112 is connected with the first non-contact wireless local communication antenna 122, the portable terminal 100 transmits a wireless charging completion signal to the charging pad 200 through the first non-contact wireless local communication unit 112 and the first non-contact wireless local communication antenna 122, in step 314.

As described above, according to the wireless charging apparatus and method in embodiments of the present invention, when some components for wireless charging that are physically separated are connected through connection terminals, the components are connected by using a few connection terminals, for example, a pair of connection terminals, so that the number of required connection terminals is decreased and a simple circuit configuration is achieved.

Also, according to the wireless charging apparatus and method in embodiments of the present invention, wireless power transmission control for wireless charging is performed by using non-contact local communication, so that a separate communication module for the wireless charging is not required and thus implementation costs are reduced.

Although concrete embodiments have been discussed in the detailed description of the present invention, various modifications can be made without departing from the scope of the present invention. For example, the NFC scheme has been described as the non-contact wireless local communication scheme according to embodiments of the present invention, but other wireless local communication schemes such as, for example, a ZigBee communication scheme, a Bluetooth communication scheme, an infrared communication scheme, and the like, can be used as the non-contact wireless local communication scheme. Further, the portable terminal and the charging pad have been described as an example, in an embodiment of the present invention, but any device which can perform wireless power transmission and receive wireless power to perform the charging can be applied.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A wireless charging method by an electronic device, comprising:

in response to the electronic device being put on a wireless power transmitter for wireless charging while a near field communication controller of the electronic device is in an initial or idle state, transmitting, through a near field communication antenna, identification information of the electronic device to the wireless power transmitter for an authentication process of the electronic device in an out-of-band communication scheme, based on connecting the near field communication controller to the near field communication antenna via a first terminal and a second terminal;

receiving, through the near field communication antenna and the connected near field communication controller, an authentication response corresponding to the identification information from the wireless power transmitter;

performing an operation, in response to the authentication response, that disconnects the near field communication controller from the near field communication antenna via the first terminal and the second terminal, and connects a wireless charging controller to a wireless power receiving antenna via the first terminal and the second terminal;

receiving, through the wireless power receiving antenna, wireless power from the wireless power transmitter, based on connecting the wireless charging controller to the wireless power receiving antenna via the first terminal and the second terminal;

performing, through the wireless charging controller, charging a battery of the electronic device by using the received wireless power;

determining whether the charging is complete;

performing an operation, in response to the charging being complete, that disconnects the wireless charging controller from the wireless power receiving antenna via the first terminal and the second terminal, and connects the near field communication controller to the near field communication antenna via the first terminal and the second terminal; and transmitting, through the near field communication antenna, a charging completion signal to the wireless power transmitter in the out-of-band communication scheme based on the determining, wherein a wireless power transmission control, between the electronic device and the wireless power transmitter, is performed by using a first frequency band for the wireless power receiving antenna and a second frequency band, different from the first frequency band, for the near field communication antenna.

2. The wireless charging method of claim 1, wherein the wireless charging antenna and the near field communication antenna are provided on an inner side of a housing which covers the electronic device.

3. The wireless charging method of claim 1, wherein the wireless charging antenna is electrically connected to the wireless charging controller through a plurality of connection terminals.

4. The wireless charging method of claim 1, wherein the near field communication antenna is electrically connected to the near field communication controller through a plurality of connection terminals.

5. An electronic device comprising:
a first terminal and a second terminal;
a near field communication antenna;
a wireless power receiving antenna;
a near field communication controller configured to:
in response to the electronic device being put on an external wireless power transmitter for wireless charging while the near field communication controller is in an initial or idle state, transmit, through the near field communication antenna, identification information of the electronic device to the wireless power transmitter for an authentication process of the electronic device in an out-of-band communication scheme, based on connecting the near field communication controller to the near field communication antenna via the first terminal and the second terminal, and
receive, through the near field communication antenna and the connected near field communication controller, an authentication response corresponding to the identification information from the wireless power transmitter;
wherein, in response to the authentication response, the electronic device performs an operation that disconnects the near field communication controller from the near field communication antenna via the first terminal and the second terminal, and connects a wireless charging controller to the wireless power receiving antenna via the first terminal and the second terminal; and
the wireless charging controller configured to receive, through the wireless power receiving antenna, wireless power from the wireless power transmitter, perform charging a battery of the electronic device by using the received wireless power based on connecting the wireless charging controller to the wireless power receiving antenna via the first terminal and the second terminal,
wherein a wireless power transmission control, between the electronic device and the wireless power transmitter, is performed by using a first frequency band for the wireless power receiving antenna and a second frequency band, different from the first frequency band, for the near field communication antenna.

6. The electronic device of claim 5, wherein the near field communication controller further configured to transmit, through the near field communication antenna, a charging completion signal to the wireless power transmitter in the out-of-band communication scheme, based on connecting the near field communication controller to the near field communication antenna in response to determining that the wireless charging is complete.

7. The electronic device of claim 5, wherein the wireless charging antenna and the near field communication antenna are provided on an inner side of a housing of the electronic device.

8. The electronic device of claim 5, wherein the wireless charging antenna is electrically connected to the wireless charging controller through a plurality of connection terminals.

9. The electronic device of claim 5, wherein the near field communication antenna is electrically connected to the near field communication controller through a plurality of connection terminals.

* * * * *